Figure 1:
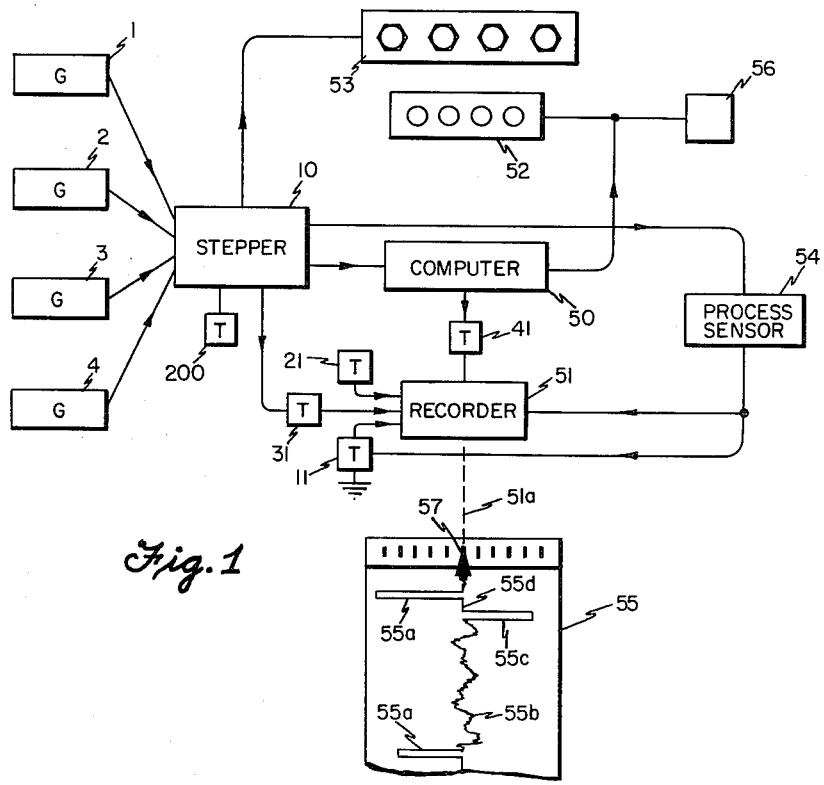

May 28, 1963     W. B. LOWMAN     3,091,756
PROCESS VARIANCE LOGGING AND LIMIT ALARM SYSTEM
Filed Jan. 6, 1958     3 Sheets-Sheet 1

INVENTOR
WALKER B. LOWMAN
By Anthony D. Cennamo

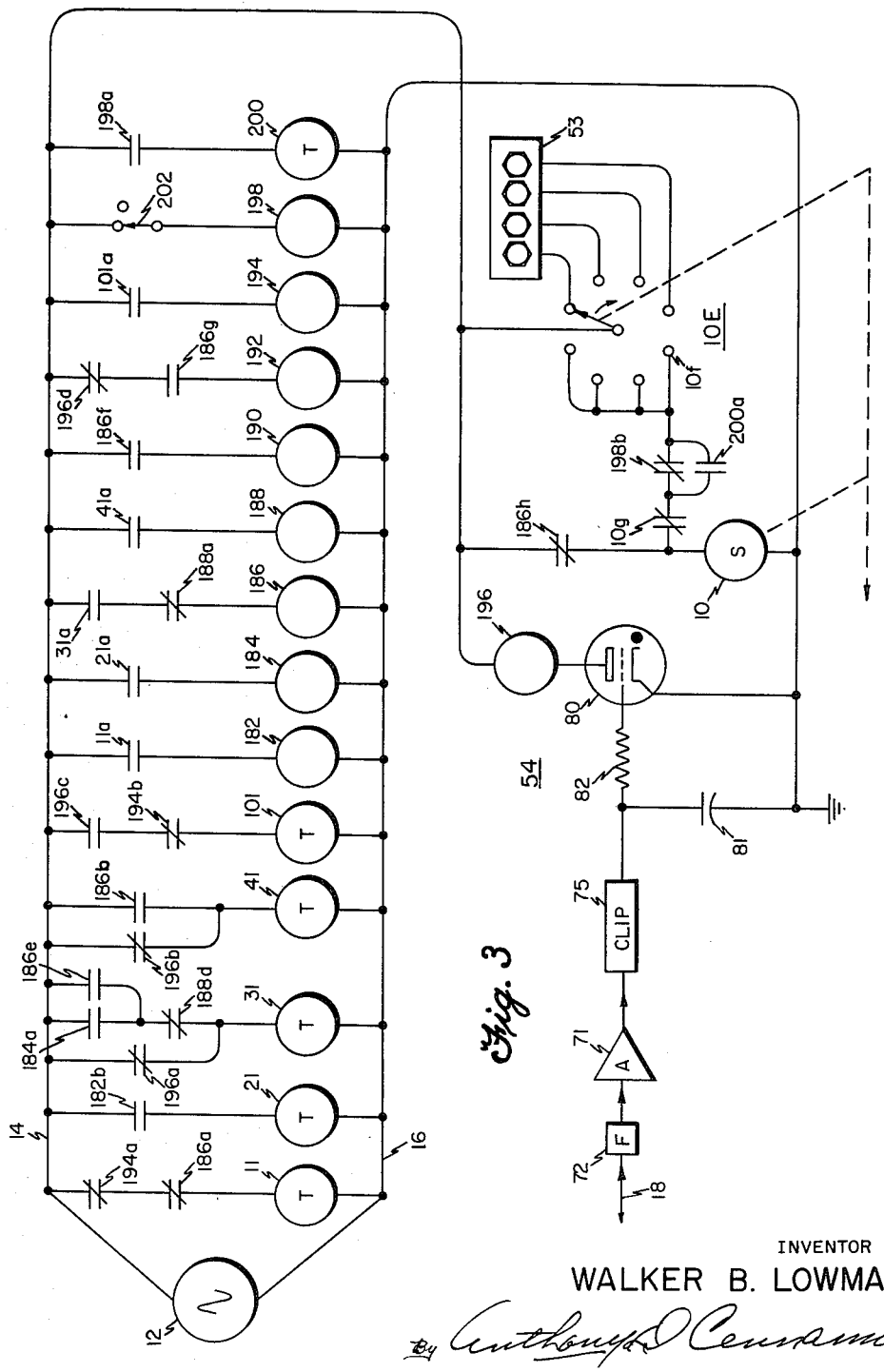

INVENTOR
WALKER B. LOWMAN 3,091,756
PROCESS VARIANCE LOGGING AND LIMIT ALARM SYSTEM
Walker B. Lowman, Columbus, Ohio, assignor to Industrial Nucleonics Corporation, a corporation of Ohio
Filed Jan. 6, 1958, Ser. No. 707,191
7 Claims. (Cl. 340—213)

This invention relates generally to a system for evaluating a production process and more specifically to method and means for continuously monitoring a large number of product makers and automatically reporting on the quality of their product.

In modern manufacturing operations, the determination of statistical quantities such as variance and standard deviation is such an important part of the quality control function that in the past an appreciable amount of time, expense, and labor has been consumed in gathering samples, measuring and classifying the same, recording data and making the necessary computations therefrom. In general these expenditures have been more than justified by the results achieved in bringing manufacturing processes under statistical control. The analysis of such statistical data has given invaluable aid in optimizing the selection of raw materials and sources thereof, in comparative appraisal of alternative manufacturing methods, in evaluating the effects of environmental factors on the performance of workmen, in comparative appraisal of machine operating techniques, in timely detection of maladjustment or failure of machinery in service, in establishing realistic tolerances, in improving vendor-consumer relations, and in general upgrading the quality of manufactured goods.

Despite the proven merit of the statistical process control method, the full utilization thereof has been severely curtailed in the past by two major limitations. Firstly, the laborious nature of the sampling, measurement and computational procedures has generally confined the data available for investigation to a fraction smaller than necessary of the total production. Accordingly, in one alternative sample-collecting procedure, the samples have been so widely spaced in time that true short term dispersion could not be seen. On the other hand, if comprehensive sampling was done, the length of time elapsing between tests was so great that often adverse trends were not detected in time to prevent a process from going completely out of control. Secondly, in any case, the final results of these tests usually were not available for some time after the samples had been collected, so that in the event of failure of one of the quality effecting aspects of the process a quantity of the product already made often had to be scrapped or reworked. In short, the information gained through these manual procedures has had a tendency to be too little and too late.

In accordance with this invention, a process is comprehensively monitored by computer means providing automatic variance readout or standard deviation at predetermined intervals. The preferred embodiment of the invention as described herein is particularly well adapted for use in controlling an industrial process from which there is a continuous flow of a finished or semi-finished product. This is the case, for example, in the manufacture of cigarettes, textiles, paper, rubber and plastics goods, foods, metals and the like; a characteristic of which can be measured in a continuous manner by means of a gauging device such as is described in a co-pending application, Serial No. 641,414, filed February 20, 1957, by Philip Spergel and Sidney A. Radley, now Patent No. 2,955,206.

In accordance with a preferred embodiment of the present invention, method and means are provided for a large number of product makers in a factory wherein the quality and/or quantity of the product from each maker is periodically and automatically analyzed. The system is initiated by a signal emanating from a plurality of gauging devices, each similar to that of the aforementioned co-pending application, and which signal represents the instantaneous deviation of the measured characteristic from a desired value. The signal from a gauging device is fed into a computer, which may be that disclosed in U.S. application, Serial No. 668,935, filed July 1, 1957, by Sidney A. Radley for Evaluation Computer, now Patent No. 2,965,300. The information from the computer is then fed to a permanent recorder together with additional useful information. After this information is recorded, the signal from the next succeeding gauging device is analyzed and so on until the information from each gauging device in the plant is automatically and periodically analyzed and recorded.

It has been shown in a typical factory demonstration of the present invention that a number of unit products could be analyzed per day by a single maker which would require the equivalent of 50 days weighing with an automatic mechanical weighing device to get the same amount of information. In addition no personnel are required to operate the system nor to handle the products.

Accordingly, it is an object of the present invention to provide method and means for automatically and periodically analyzing the products issuing from a plurality of product makers in a continuous process.

It is another object to provide an automatic monitoring system for a plurality of product makers that presents the statistical analysis of measured data from each product maker immediately and repeatedly on a permanent record form.

It is a further object of the present invention to provide means whereby each product maker in a plurality of makers of an industrial process is kept under comprehensive statistical observation at all times without the necessity for conducting manual sampling, measurement or computational procedures.

It is still another object to provide said automatic monitoring means that is: relatively inexpensive to build, simple to operate, requires a minimum of components, has ease of adjustment and maintenance, and is readily adaptable to product makers in operation today.

Figure 2:
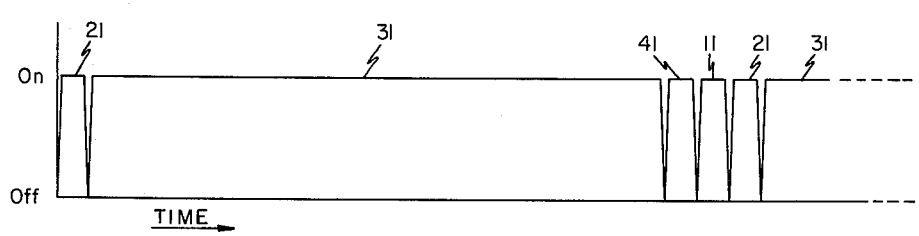
Figure 3:
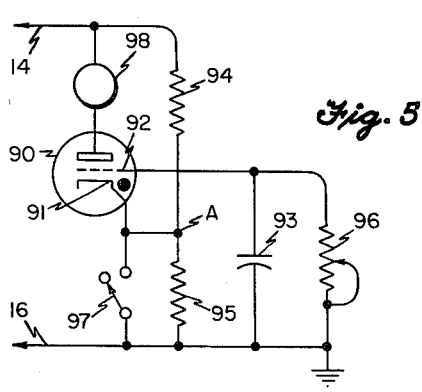
Figure 4:
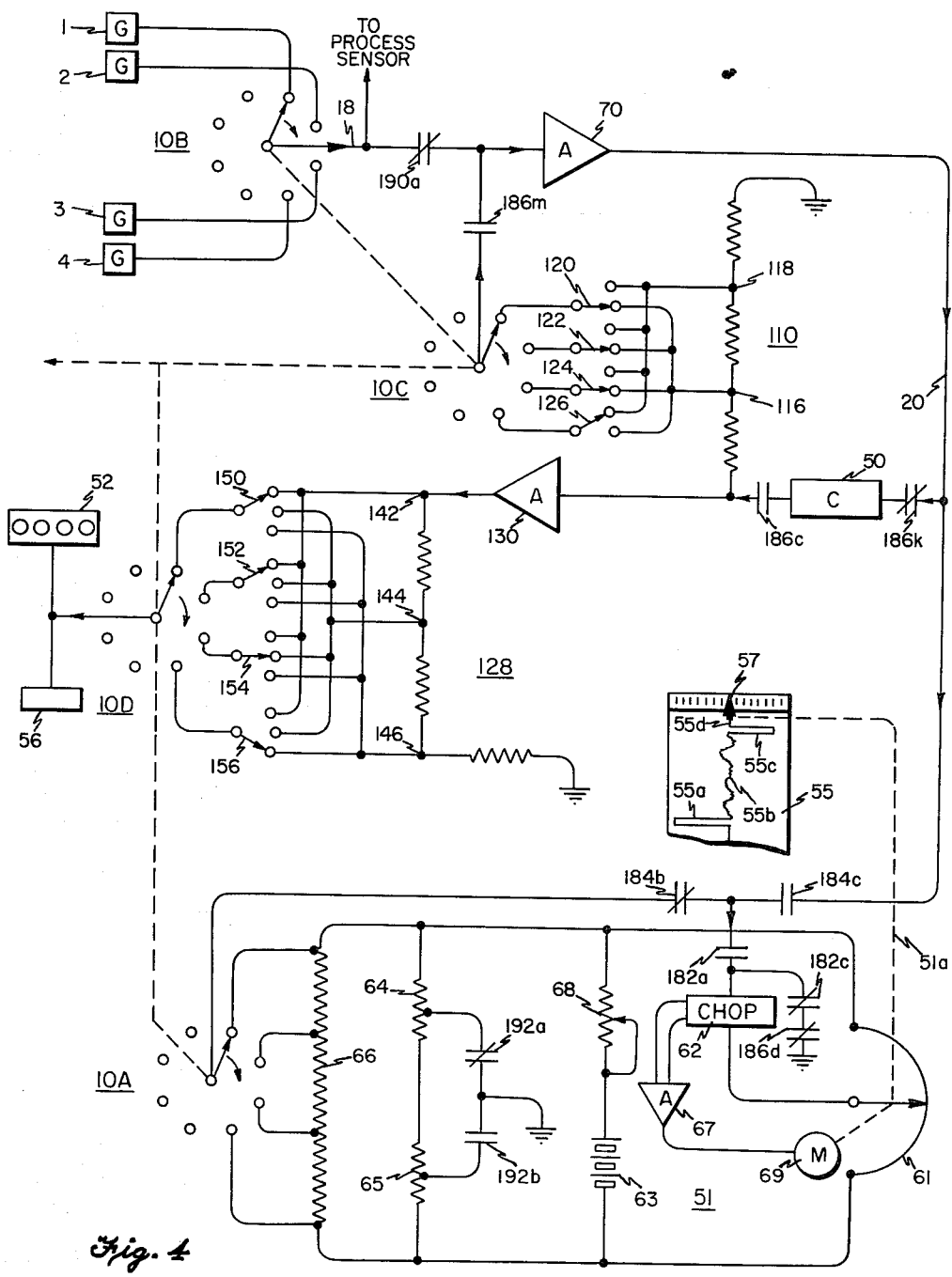

Other objects and advantages will become apparent from the following detailed description when taken in conjunction with the drawings in which:

FIG. 1 is a typical embodiment of the present invention shown in block diagram form, FIG. 2 is an indication of a typical sequence of timing periods of the timers shown in FIG. 1, FIG. 3 is a schematic diagram of the controlling timers and relays utilized in an embodiment of the present invention shown in FIG. 1, FIG. 4 is a further schematic diagram of the present invention shown in FIG. 1, and FIG. 5 is a typical electronic timing circuit suitable for use in the system of the present invention.

With reference to FIG. 1 a general description of the operation of the system may now be had. The blocks indicated 1 through 4 are representative of a plurality of gauging devices, each capable for instance of emitting a process signal representing the amount of material per unit length of product produced by one of four product makers (not shown). These signals which represent mass per unit area as a D.C. varying voltage, are fed to a stepping selector switch 10. Switch 10 is capable of automatically and sequentially connecting the signal from the gauging devices 1 through 4 to a recorder 51 and a computer 50. The timing operation of switch 10 in stepping from one gauging device to the next is timed by a timer shown generally at 31. This time, which may be variable, is sufficient to allow an accurate analysis of the quality of the product of that particular product maker to which the gauging device is connected.

Also connected to the selector switch 10 is a process sensor 54 capable of determining whether or not each of the gauging devices is operating. If no process signal is available from any one of the gauging devices 1 through 4 (which may mean the maker is down), the process sensor 54 causes the selector switch 10 to step on to the next gauging device in the sequence. If no process signal is presented to the process sensor 54 for a given period of time representing a number of cycles, the system goes on "stand by" disabling the sequencing timer 11. The purpose of this operation is to prevent the system from operating when no useful information is available.

Associated with the computer 50 is an indicator panel 52 which records on a bank of lamps or other suitable indicating means, the product makers that excessively drift or deviate from a specified tolerance. Another panel 53 indicates by suitable means which product maker is being analyzed. These units may be conveniently placed on panels on the operator's control console to present a comprehensive view showing what product maker is being analyzed and on which an unacceptable product is being made. A suitable alarm device 56 may also be utilized to provide an audible trouble signal.

Also connected to the recorder 51 is a circuit (not shown in FIG. 1) to provide a distinct identifying voltage for each gauge. The length of time permitted for identification is determined by a timer 21 after initiation by selector switch 10. Accordingly, on a recorder strip chart 55, a signal trace 55b illustrating process variations, that is, the signal representing product variations from the gauging device, is preceded by a mark 55a the length of which identifies the particular product maker being monitored. The length of time in which the process variations are recorded is governed by the timer 31.

Following the process variation information being recorded as a signal trace 55b, another timer 41 connects recorder 51 to the output of computer 50. Computer 50 now transfers the computed variance of the process signal to the recorder 51 for recording on chart 55 as a trace 55c by a recording pen 57. Timer 41 determines the length of time devoted to variance readout. Next timer 11 clamps the recorder 51 to ground and a center line trace 55d signifies the end of monitoring of that particular product maker. Although each timer is actuated by another in a sequential procedure, the dependence of one timer on another is not illustrated in FIG. 1 since it is hereinafter explained in detail. Operating independently of timers 11—41 is a recycle timer 200 controlling the number of times a particular maker is monitored in a certain period. It is readily understood of course that the recorder 51 is illustrated herein for purposes of simplicity and may take any other recording form known in the art.

In brief, then, the sequential operation of the system may be illustrated in FIG. 2 in conjunction with FIG. 1 by the operation of the timers as follows: timer 21 initiates the operation of the system by switching an identifying signal to recorder 51 to indicate on the chart 55 the product maker being monitored; after the product maker is identified, timer 21 initiates timer 31 to switch the process signal from one of the gauging devices 1 through 4 to both computer 50 and the recorder 51 and after a predetermined time initiates timer 41. Timer 41 switches the output of the computer 50 into the recorder 51 also for a predetermined time and initiates timer 11 which clamps the recorder to ground for a predetermined time.

In a typical operation the time for duration of the information being presented to the recorder may be as follows: product maker identification 5 seconds, process signal for 2 to 5 minutes, variance readout 10 seconds and recorder clamped for 5 seconds. It is of course appreciated that these times may be set on each timer to satisfy the particular need.

Referring to FIG. 3 and FIG. 4 the detailed operation of the timers in controlling the system is shown. Referring especially to FIG. 3 the various relays and timers are connected to a convenient source of power 12 by supply lines 14 and 16. The contacts of each timer and relay bear the reference numeral of that particular timer or relay to which it is associated followed by a lower-case letter to distinguish between separate contacts of the same timer or relay. FIG. 3 also schematically illustrates the incorporation of the process sensing 54 and selector switch 10 into the system.

A typical rebalance bridge circuit suitable for use in the recording system is that shown in the recorder 51 of FIG. 4. The rebalance bridge comprises a slidewire 61 which is mechanically connected to the recording pen 57 by line 51a, a bridge voltage supply 63 and potentiometers 64, 65 and 68. The input to the recorder 51 consists of a conventional arrangement of a chopper 62 feeding a D.C. amplifier 67 which drives a rebalance motor 69 to turn the slidewire 61. With contact 192a grounding the center tap of resistor 64, the zero signal position of the recording pen 57 of recorder 51 is at the center of the chart 55; this is the case for recording process variations. For variance readout, the center tap of resistor 65 is grounded by relay contact 192b, moving the zero reference to the left side of the chart 55. For identification of the signal source, center tap of resistor 64 is connected to ground and the appropriate resistance of a resistor bank 66 is connected across the bridge by a deck 10A of selector switch 10. The bridge will then be unbalanced so that the balanced position of the recording pen 57 will be off the center line of the chart 55 by varying amounts depending on the resistance selected. Potentiometer 68 controls the overall bridge voltage and therefore the recorder span.

Another deck 10B of the selector switch 10, reference FIG. 4, sequentially connects the process signal from each gauging device 1 through 4. This signal is transmitted over line 18 to process sensor 54 and to the recorder 51 and computer 50 by means of amplifier 70 and line 20. In the processing sensor 54, shown in FIG. 3, the signal is passed through a filter 72, amplified at 71 and passed through a conventional clipping circuit 75. Only the positive going portions of the process signals charge capacitor 81 which is connected to the grid of a gas-filled thyratron 80 through a resistor 82. A process sensing relay 196 is connected in the plate circuit of tube 80 so that its energization depends on the conduction of tube 80 and accordingly is indicative of process signals being received from the gauging device under evaluation.

The process signal from each gauging device is alternatively connected to the recorder 51 (referring again to FIG. 4) through amplifier 70 and relay contacts 190a, 184c, and 182a.

Also connected to the output of amplifier 70 is a variance computer 50 which develops an electrical voltage proportional to the variance of the process signal. The output of computer 50 is applied across a voltage divider network 110 composed of three resistive elements. Four switches 120, 122, 124 and 126 are connected between deck 10C of the selector switch 10 and the two taps 116 and 118 on the voltage divider network 110. The operation of the switches in conjunction with the divider network 110 is described in detail hereinafter. The voltage proportional to variance is thus transmitted by means of contacts 186m through amplifier 70 to the recorder 51 for purposes of recording the variance of the process under evaluation. It will be realized by those skilled in the art that the computer may be easily adapted to deliver a signal representing process means as well as process variance to the recorder 51.

In order that an excessive product variance immediately attract the attention of operating personnel, suitable indicating and alarm circuits for each product maker in the system must be energized at the proper time. To this end the voltage proportional to variance from computer 50 is sent to an amplifier 130. To the output of amplifier 130 is connected a voltage divider network 128. At voltage taps 142, 144, and 146 on the divider network 128 there are connected four single pole, triple throw switches 150, 152, 154 and 156. The detailed operation of the switches and the divider is also described hereinafter. However, the variance voltage from any particular switch is sequentially selected by deck 10D of selector switch 10 and sent to an excessive variance indicator panel 52. Indicator panel 52 displays a light for each gauging device being analyzed. A conventional holding circuit (not shown) is employed to hold any particular light on until the product maker associated with that particular light is again analyzed. An audible alarm 56 may be connected to the computed variance voltage circuit as a further signaling device.

Another deck 10E of the selector switch 10, referring again to FIG. 3, serves to energize suitable indicating lights on panel 53 to show the product maker being monitored. The remaining unused contacts of this deck are wired together and serve to energize the stepper coil of selector switch 10 whenever the rotor arm of deck 10E rests on one of these contacts and when relay contacts 200a of the recycling timer 200 or contacts 198b are closed. The breaker contacts 10g of the selector switch 10 serve to rotate the rotor arm around to its starting position by its subsequent opening and closing. Thus is shown a typical homing circuit for such a switch.

In the sequential operation of timers of the system, with the rotors of the separate switch decks in the position shown in FIGS. 3 and 4 the contacts 182c and 186d are closed, thereby grounding the input to the recorder 51. With the recorder 51 clamped to ground, trace 55d is produced until timer 11 times out. Timer contacts 11a will then energize relay 182 whose contacts 182b start timer 21. In this condition the recorder input is disconnected from ground and the bridge of the recorder 51 sees across its input the bank of resistors 66. The bridge will balance itself by moving the slidewire 61 and concomitantly the pen 57 across the strip chart 55 through linking shaft 51a. The pen will thus position itself near the left-hand edge of the chart 55. This position will vary across the chart 55 since the switch rotor of deck 10A picks off a distinct amount of resistance for each product maker. If, during the preceding monitoring cycle, an excessive process variance from maker 1 was detected, the visual indicator on panel 52 would stay on while the remaining makers are evaluated. However, contacts (not shown) of relay 182 extinguish this light when the product maker is being identified again on the succeeding monitoring cycle.

After the set time, timer 21 times out causing contacts 21a to actuate relay 184 which in turn starts timer 31, disconnects the resistance of the identification network 66 and connects the output of amplifier 70 to the recorder input by means of contacts 184a, 184b, and 184c respectively. While timer 31 is running, the process variations are being recorded on the chart 55 and the variance and mean of the process signal are being computed by computer 50. The time of process readout and variance computation is normally considerably longer than that required for product maker identification since a substantial amount of time may be needed to compute a value for variance of acceptable statistical reliability.

It should be noted here that if gauging device 1 is producing a varying voltage representing process variations, the positive-going portions only of this varying voltage will positively charge capacitor 81. This allows tube 80 to conduct, energizing the process sensing relay 196 thereby keeping contacts 196a, 196b, and 196d closed and 196c open. Contacts 196a and 196b permit timer 31 and timer 41, respectively, to operate when initiated.

Eventually timer 31 times out so that timer contacts 31a actuate relay 186 through closed contacts 188a. Contacts 186a, 186b and 186c respectively, disconnect power from timer 11, start timer 41 and connect the voltage representing computed variance to both a variance compensating circuit shown generally at 110 and maker compensating circuit 128. Contacts 186d, 186e and 186f respectively eliminate clamping of the recorder 51 input to ground, clamp timer 31 on and actuate relay 190. Relay contacts 186g, 186h and 186k respectively energize relay 192, rotate the stepper rotors one position clockwise and disconnect the input to the computer 50. The variance voltage selected from deck 10C is delivered to the amplifier 70 by the closed contacts 186m.

Of the several product makers incorporated at one time in a manufacturing process several may be involved in the production of a premium product which is quantitatively different from the standard product. An example of this practice is the production of cigarettes of two distinct lengths by a number of cigarette makers. Since the variance of regular length cigarettes is greater than that of king-size cigarettes of the same unit length variation, this difference must be compensated by the circuit shown at 110.

The switches 120—126 select for each gauging device being monitored that level of potential on the divider network 110 which corresponds to the product made by that particular product maker. In the case of gauging device 1, its product maker may be producing regular cigarettes so the variance readout takes place from the higher potential, tap 116. This voltage is amplified at 70 and transmitted to the input of recorder 51. If, however, the fourth gauging device was being monitored and its maker was producing king-size cigarettes, switch 126 would pick a lower voltage off the divider 110 at tap 118. It must be noted that contacts 192b are now closed to connect the center tap of resistor 65 to ground which shifts the recorder pen 57 zero position to the extreme left-hand edge of the chart 55. This is done only during variance readout when the entire span of the recorder bridge is required. As the variance is read out by the recorder 51 all process signals from the next gauging device are blocked from amplifier 70 by the contact 190a, which is now open.

Since both the make and age of a product maker may determine its ability to produce cigarettes within desired tolerances, each different product maker may be arbitrarily assigned a level of performance. A product maker may be classed as a good, medium or poor device and the variance indication should be made relative to the performance expected of that product maker, e.g., a variance of products of a good product maker will be small compared to that of a poor product maker.

To provide a level of performance for an excessive variance indicator panel 52 and alarm device 56 is the purpose of the voltage divider network 128 which compensates for this difference in product makers. The amplifier 130 serves a two-fold purpose by amplifying the variance voltage as well as providing an impedance matching device which isolates voltage divider networks 110 and 128 each from the other.

A three position switch is associated with each gauging device that is monitored to provide several fixed voltage levels that may be picked off an appropriate tap of the divider. The switch position may be marked Good, Medium, and Poor. If it happens that product maker 1 is relatively new, switch 150 will connect deck 10D to tap 142 of highest potential on the divider network 128. A poor product maker such as the last one is connected to a tap 146 of lowest potential. The stepper rotor of deck 10D delivers this voltage to the indicator panel 52 whose individual lights will be ignited if this voltage is more than a set limit. Alarm device 56 may also be actuated by an excessive variance.

Referring again to the timing operation, when timer 41 times out shortly after timer 31, timer contacts 41a energize relay 188. The contacts 188d and 188a of this relay de-energize timer 31 and relay 186 respectively. Contact 186a closes to allow timer 11 to run and the input to recorder 51 is clamped to ground by contact 186d. The zero voltage point of the recorder is simultaneously shifted from the left side of chart 55 to the center by the closing of contacts 192a which grounds the center tap of resistor 64. At this time the trace 55d is drawn on chart 55 by recording per 57, signifying the completion of monitoring for that product maker.

The aforementioned procedure is repeated for each gauging device unless a particular product maker is inoperative ("down"). If this is the case, the process sensor 54 will not receive a process signal, the positive charge on capacitor 81 will decay and cut off the flow of plate current in tube 80 and likewise through relay 196. Contacts 196a and 196b open to allow timers 31 and 41 to operate immediately after timer 21 times out so that no time is spent reading out process variation and variance which are not present for that gauging device. Contact 196c closes to operate timer 101 whose time out actuates relay 194 through contacts 101a. Should a number of machines be inoperative for a certain length of time determined by timer 101, relay 194 will be energized and power to timer 11 will be disconnected by contact 194a. This may also shut down the recorder and light a standby light. A means to take the system off of standby condition will be apparent to those skilled in the art so a description of a releasing circuit is not shown.

The stepping action of selector switch 10 is caused by the periodic closing and opening of relay contacts 186h until the last gauging device is analyzed. When the rotor moves to the first unused contact 10f of deck 10E the stepper coil of selector switch 10 will be actuated through the closed contacts 198b and breaker contacts 10g. The breaker contacts 10g will open to move the rotor to the next contact. The rotor will swiftly pulse around in a conventional manner until it finds a contact which is not wired to the stepper coil 10.

Dependent on the number of product makers that are operating is the number of times a particular product maker is monitored in a given period. However, a recycle control may be utilized to enable a product maker to be analyzed only once during a given period regardless of the number of inoperative product makers. The length of this period may be set on a timer 200 whose actuation depends on the closure of relay contacts 198a. Switch 202 is used to deenergize relay 198 to initiate the recycle control.

Throwing switch 202 releases relay 198 so that contacts 198a start the recycle timer 200 and open relay contacts 198b. Now when all four product makers have been monitored and the rotor of deck 10E reaches contact 10f it will remain there until timer 200 times out causing closure of contact 200a. The rotor will now quickly step to its starting position to start analyzing the product maker associated with gauging device 1.

As readily seen above the timing circuits control the sequence of events, including the operation of the stepping selector switch 10 and the order and duration of the recorded information. The basic timing circuit suitable for use in the system is shown in FIG. 5 to which reference may be had. As long as the cathode 91 of thyratron tube 90 is connected only to point A, on the half cycle when point A is negative with respect to ground there will be electron flow from cathode 91 to grid 92, charging capacitor 93 negatively. The maximum charge accumulated by capacitor 93 depends on the relative values of resistors 94 and 95, the applied voltage, and the active resistance of potentiometer 96. Part of the cathode-grid current flows through potentiometer 96 developing a voltage equal to the voltage on capacitor 93.

When the cathode is shorted to ground through switch 97, the voltage on capacitor 93 decays through potentiometer 96 and when sufficiently reduced tube 90 goes into conduction energizing relay 98. The time between the grounding of the cathode of tube 90 and its conduction is controlled by the setting of potentiometer 96. The contacts of relay 98 perform functions desired at the end of that timing period. One of these functions may be to initiate the timing interval of another similar circuit by grounding a thyratron cathode.

The timing interval may be increased to several minutes by increasing the resistance of potentiometer 96 to a very large value (several megohms). To maintain a fairly sharp discharge curve at the bias level of tube 90, the lower end of potentiometer 96 may be connected to a small positive voltage rather than to ground, thus providing better repeatability of timing duration. Tube 90 is cut off and relay 98 de-energized when the cathode 91 is disconnected from ground and returned to point A.

Although the numerous advantages obtained by the utilization of this invention are fully realized and appreciated by those skilled in the art, it should be realized that various changes, additions, and omissions of the preferred embodiment may be resorted to without departing from the spirit and scope of this invention.

Having thus described my invention, what I claim is:

1. In a production process having a plurality of product makers, a product evaluation system comprising means for continuously measuring the process variations in the quality of a product produced by each of said makers, a monitor including means for computing the variance of said quality of the product produced a selector connected to each of said measuring means, time-controlled means controlling the operation of said selector to connect said measuring means to said monitor individually at predetermined intervals, means alternately connected by said selector to said monitor and to said measuring means for automatically and graphically indicating respectively the computed variance and the process variations of the quality of said product, and a process sensor connected to said selector, said process sensor having means to immediately advance said selector in the absence of information from said measuring means being monitored.

2. In a production process having a plurality of product makers, a product evaluation system comprising, means for continuously measuring the instantaneous product quality of a product being produced by said makers; means for monitoring each of said makers including means for computing the standard deviation of said product quality; a plurality of alarm means one each for each of said makers, said alarm means being individually energized upon the occurrence of a predetermined standard deviation; a selector switch connected to each of said measuring means, means for simultaneously connecting said monitoring means to said alarm means to energize same at the occurrence of said predetermined standard deviation; time-controlled means to control the operation of said switch at predetermined intervals; recording indicator, means for alternately connecting said recording indicator to said measuring means and said monitoring means for graphically and automatically sequentially indicating respectively the instantaneous product quality and the computed standard deviation of said product quality for the product produced by each of said makers.

3. In a production process having a plurality of product makers, a product evaluation system comprising, means for continuously measuring the instantaneous variations in the quality of a product being produced by said makers; means for monitoring each of said makers including means for computing the variance of the quality of said product; a selector switch connected to each of said measuring means; time-controlled means to control the operation of said switch at predetermined intervals;

recording indicator means for alternately connecting said recording indicator to said measuring means and said monitoring means for graphically and automatically sequentially indicating the measured variations in quality and the computed variance of the quality of said product; and means for identifying the individual maker being monitored, said last mentioned means being operatively connected to said recording indicator means by said selector switch.

4. In a production process having a plurality of product makers, a product evaluation system comprising, means for continuously measuring the instantaneous variations in the quality of a product being produced by each of said makers and operative to provide a first electrical signal indicative of said quality; a monitor including computer means for computing the variance of said quality; a selector sequentially connecting said first electrical signal from each of said measuring means to said monitor to provide a second electrical signal indicative of said variance; and recording means alternately receiving said first and second electrical signals to automatically graphically record same on a sheet of said recording means.

5. In a product evaluation system substantially as set forth in claim 4, said system further including a time-controlled means to control the operation of said selector by connecting each of said first electrical signals sequentially to said monitor at predetermined intervals.

6. In a product evaluation system substantially as set forth in claim 4 wherein there is further included a plurality of alarm means associated with each of said makers and wherein said selector additionally connects said second electrical signal to said alarm means to energize same means when said second electrical signal exceeds a predetermined value.

7. In a product evaluation system substantially as set forth in claim 4 wherein said selector further includes means for generating a plurality of third electrical signals each identifying one of said makers and means for feeding said third electrical signals to said recording means.

References Cited in the file of this patent
UNITED STATES PATENTS

| | | |
|---|---|---|
| 2,578,447 | O'Dell | Dec. 11, 1951 |
| 2,680,240 | Greenfield | June 1, 1954 |
| 2,815,500 | Hance | Dec. 3, 1957 |
| 2,883,255 | Anderson | Apr. 21, 1959 |